A. McD. LARROWE & A. L. KLINE.
ICE CREAM DIPPER.
APPLICATION FILED AUG. 8, 1917.
1,253,057.
Patented Jan. 8, 1918.
2 SHEETS—SHEET 1.
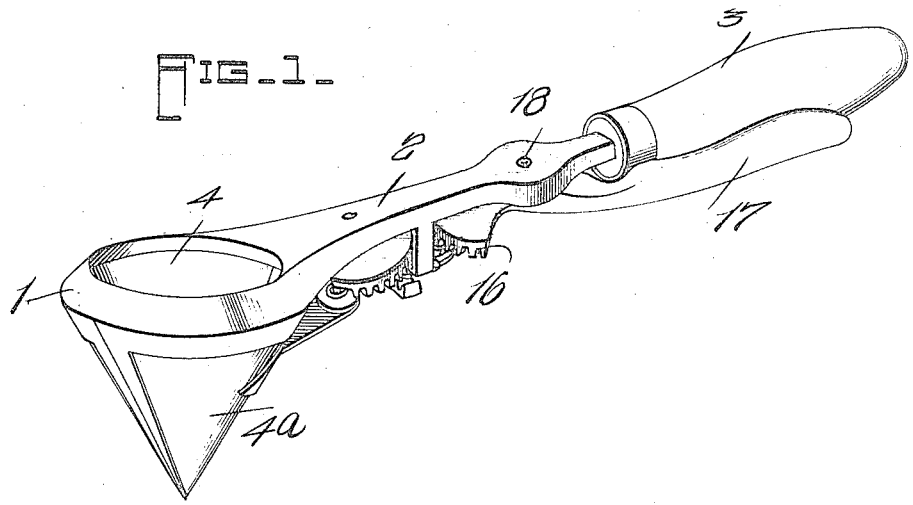
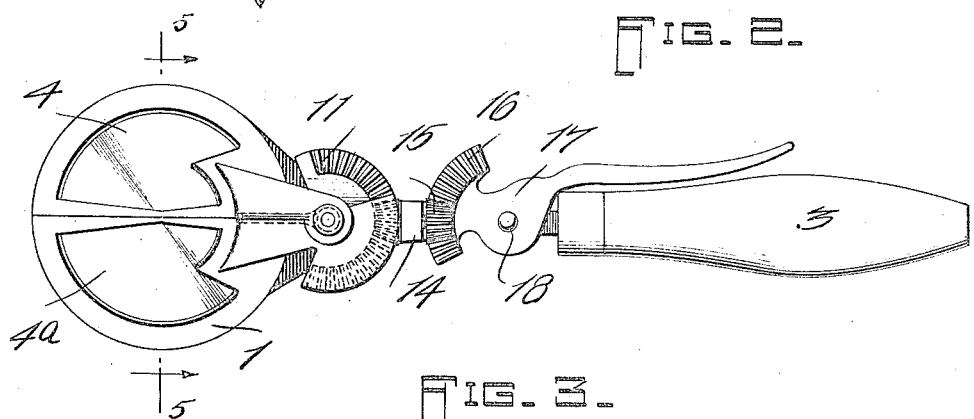
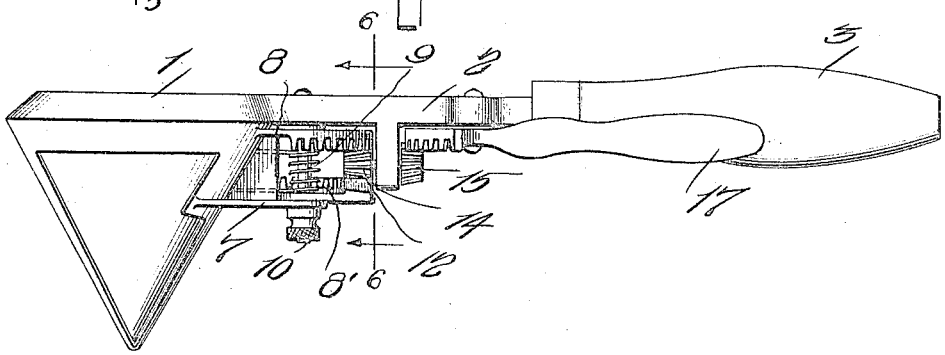
WITNESSES
INVENTOR
AZEL L. KLINE
ARTHUR McD. LARROWE
BY
ATTORNEYS A. McD. LARROWE & A. L. KLINE.
ICE CREAM DIPPER.
APPLICATION FILED AUG. 8, 1917.
1,253,057.
Patented Jan. 8, 1918.
2 SHEETS—SHEET 2.
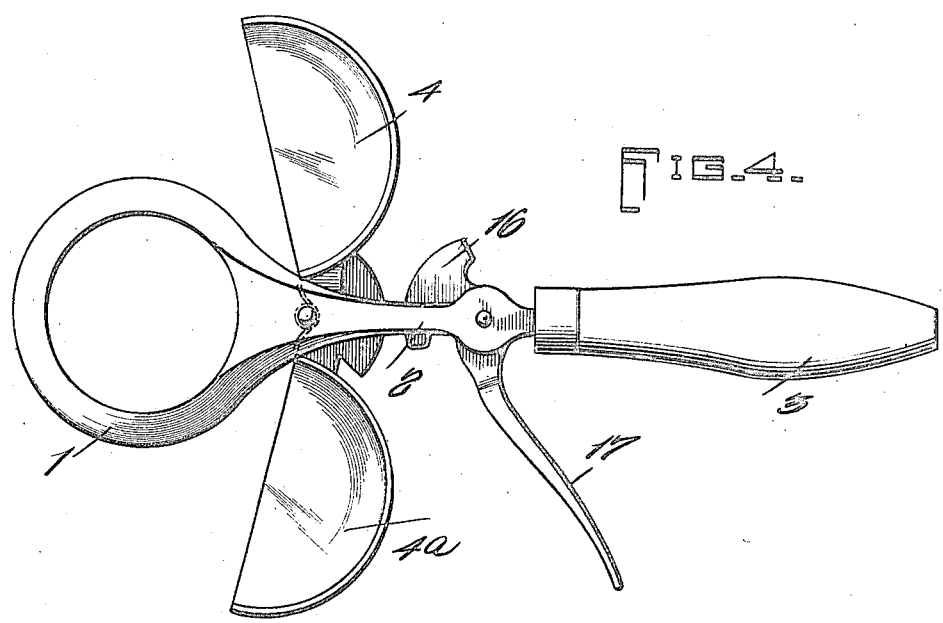
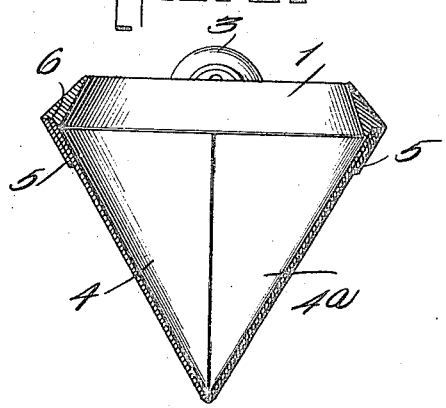
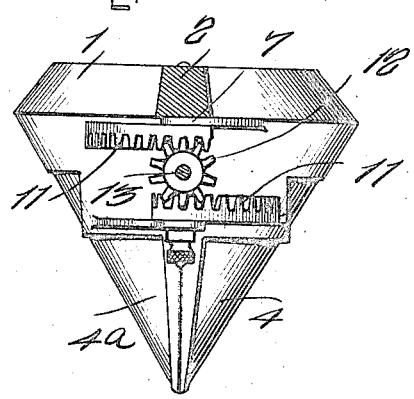
WITNESSES
John X. Phillips Jr.
H. J. Bossé
INVENTORS
AZEL L. KLINE
ARTHUR McD. LARROWE
BY
ATTORNEYS

UNITED STATES PATENT OFFICE.

ARTHUR McDOWELL LARROWE AND AZEL LEWIS KLINE, OF CANISTEO, NEW YORK.

ICE-CREAM DIPPER.

1,253,057.

Specification of Letters Patent.

Patented Jan. 8, 1918.

Application filed August 8, 1917. Serial No. 185,044.

*To all whom it may concern:*

Be it known that we, ARTHUR McDOWELL LARROWE and AZEL LEWIS KLINE, citizens of the United States, and residents of Canisteo, in the county of Steuben and State of New York, have invented new and useful Improvements in Ice-Cream Dippers, of which the following is a specification.

Our invention is an improvement in ice cream dippers, and has for its object to provide a device of the character specified wherein a handle member is provided having a cutting ring for permitting the cream to be scraped out when hard, and a holder of conical shape consisting of sections which are arranged to close against the ring and be closed by mechanism operated from the handle member.

In the drawings:

Figure 1 is a perspective view of the improved dipper;

Fig. 2 is a bottom plan view;

Fig. 3 is a side view,

Fig. 4 is a top plan view of the holder open;

Figs. 5 and 6 are sections on the lines 5—5 and 6—6, respectively, of Figs. 2 and 3, both views looking in the direction of the arrows adjacent the line.

In the present embodiment of the invention the improved dipper comprises a ring 1 having a shank 2 to which is connected a handle 3 for convenience in holding and operating the ring. This ring, as shown more particularly in Figs. 1 and 5, is tapering or frusto-conical, and has its small or upper end sharpened, as shown, to provide a cutting edge for permitting hard cream to be scraped out to fill the container which is supported by the ring.

The said holder or container is conical, consisting of similar sections 4 and 4ª which, when in operative position, form a tapering or conical container for the cream. Each section has its upper edge reinforced, as indicated at 5, and the said sections close against a rabbeted shoulder 6 on the ring at the base or large end thereof. Each section has a pair of arms 7 and 8, and these arms are pivotally connected together and to the handle by a pivot pin 9. The arms have openings through which the pin extends, and a nut 10 is provided for holding the parts together, the nut engaging the pin, as shown. The arms 8 of the sections carry gear segments 11, the said segments facing, as shown in Fig. 3, and the segments of each section engage a bevel gear 12 on a stub shaft 13 which is journaled in a lug 14 depending from the shank 2.

A second pinion 15 is secured to the shaft at the opposite side of the lug 14 from the pinion 12, and this pinion engages a gear segment 16 on one end of a lever 17 which is pivoted to the shank, as indicated at 18. When this lever is swung into the position shown in Figs. 1, 2 and 3, the sections 4 and 4ª are moved toward each other, while, when the lever is moved away from the handle, the sections are moved apart, as shown in Fig. 4.

In use, the parts are arranged as shown in Fig. 1 and the dipper is filled in the usual manner, the edge of the ring 1 permitting the scraping of hard cream to fill the dipper. When it is desired to empty the dipper the lever 17 is swung outwardly into the position of Fig. 4, thus moving the sections widely apart and permitting the cone of cream to drop into the holding cone.

It will be noticed from an inspection of Fig. 3 that a coil spring 8' is arranged between the segments 8 and 9, the said spring normally acting to force the segments apart. The arrangement of the lever is such that when it is pressed toward the handle in the natural action of holding the handle the sections are pressed together.

The ring 1 serves to scrape out the cream, and also to hold the cream in proper position to enter the cone, and to prevent it from adhering to either section of the container when open.

We claim:

1. An ice cream dipper comprising a handle, similar dipper sections having arms which are pivotally connected to admit of said dipper sections swinging laterally into open or closed position, a rotary member mounted on the handle, and connecting means between the said arms and said rotary member disposed upon opposite sides of the axis of the rotary member to swing the arms laterally to open or close the dipper.

2. An ice cream dipper comprising similar halves pivotally connected at one side and adapted to swing laterally at the opposite side away from and toward each other, spaced gear segments connected to the similar halves and concentric with the axis thereof, and a gear element disposed between the gear segments and in mesh therewith to effect a like lateral swinging of the halves in opening and closing the dipper.

3. An ice cream dipper comprising a handle, dipper sections having lateral arms pivoted together and to the handle, said arms having gear segments concentric with their axis and spaced apart, a shaft mounted on the handle and having a gear at one end disposed between the gear segments and in mesh therewith, an operating member pivoted on the handle, and a gear connection between the operating member and the said shaft for rotating the latter.

4. In an ice cream dipper, a ring, dipper sections disposed to close against the ring, and means for swinging the dipper sections away from and toward the ring in the plane of the latter.

5. An ice cream dipper comprising a ring having a handle, dipper sections having arms pivoted to each other and to the handle, and provided with spaced gear segments concentric with the pivot connection of the arms and the handle, a shaft mounted on the handle and having a gear at one end disposed between the gear segments and in mesh therewith, and having a gear at its opposite end, and an operating member pivoted on the handle, and provided with a gear segment in mesh with the gear at the outer end of the said shaft.

ARTHUR McDOWELL LARROWE.
AZEL LEWIS KLINE.

Copies of this patent may be obtained for five cents each, by addressing the "Commissioner of Patents, Washington, D. C."